(12) United States Patent
Qiu et al.

(10) Patent No.: US 11,408,327 B2
(45) Date of Patent: Aug. 9, 2022

(54) THERMOSTAT AND TEMPERATURE CONTROL SYSTEM

(71) Applicant: Zhejiang Sanhua Automotive Components Co., Ltd., Zhejiang (CN)

(72) Inventors: Haoming Qiu, Zhejiang (CN); Bin Yin, Zhejiang (CN); Zhiyong Liao, Zhejiang (CN)

(73) Assignee: Zhejiang Sanhua Automotive Components Co., Ltd., Hangzhou (CN)

( * ) Notice: Subject to any disclaimer, the term of this patent is extended or adjusted under 35 U.S.C. 154(b) by 623 days.

(21) Appl. No.: 16/087,837

(22) PCT Filed: Apr. 11, 2017

(86) PCT No.: PCT/CN2017/080043
§ 371 (c)(1),
(2) Date: Sep. 24, 2018

(87) PCT Pub. No.: WO2017/181869
PCT Pub. Date: Oct. 26, 2017

(65) Prior Publication Data
US 2019/0107037 A1  Apr. 11, 2019

(30) Foreign Application Priority Data

Apr. 21, 2016 (CN) .......................... 201610256981.5
Apr. 21, 2016 (CN) ........................... 201610257372.1

(51) Int. Cl.
*F01P 7/16* (2006.01)
*G05D 23/02* (2006.01)
(Continued)

(52) U.S. Cl.
CPC ................ *F01P 7/16* (2013.01); *F01P 11/08* (2013.01); *F16H 57/0413* (2013.01); *F16K 11/044* (2013.01); *G05D 23/025* (2013.01)

(58) Field of Classification Search
CPC ......... F01P 11/08; F01P 7/16; F16H 57/0413; F16K 11/044; F16K 31/002; G05D 23/025
See application file for complete search history.

(56) References Cited

U.S. PATENT DOCUMENTS 5,791,557 A    8/1998  Kunze
2004/0232249 A1*  11/2004  Brown ...................... F01P 7/16
                                                         236/34.5
(Continued)

FOREIGN PATENT DOCUMENTS

CN            1231381 A     10/1999
CN          101511626 A      8/2009
(Continued)

OTHER PUBLICATIONS

Machine Translation of WO2014023157A1 PDF file name: "WO2014023157A1_Machine_Translation.pdf".*
(Continued)

*Primary Examiner* — Grant Moubry
*Assistant Examiner* — Ruben Picon-Feliciano
(74) *Attorney, Agent, or Firm* — Wolf, Greenfield & Sacks, P.C.

(57) ABSTRACT

A thermostatic valve includes: a valve body in which a chamber is provided, an end cap assembly, a thermal actuator and a first spring mounted in the chamber. The valve body is provided with at least three ports in communication with outside; the thermal actuator includes a valve rod and a body portion, the chamber includes a first chamber and a second chamber; one end of the thermal actuator abuts against or indirectly abuts against or supports an end of the first spring close to the thermal actuator, and another end is limited to the end cap assembly; and the thermostatic valve is further provided with a guide portion in the chamber, the thermal actuator includes a guide fitting portion fitting with
(Continued)

the guide portion, and the guide portion is slidably fitted with the guide fitting portion. The thermal actuator of the thermostatic valve is not shaken heavily.

15 Claims, 12 Drawing Sheets

(51) Int. Cl.
*F16H 57/04* (2010.01)
*F01P 11/08* (2006.01)
*F16K 11/044* (2006.01)

(56) References Cited

U.S. PATENT DOCUMENTS

| | | | | |
|---|---|---|---|---|
| 2010/0126594 | A1* | 5/2010 | Sheppard | F01P 7/16 137/340 |
| 2010/0186831 | A1 | 7/2010 | Roman et al. | |
| 2012/0055565 | A1 | 3/2012 | Kanzaka et al. | |
| 2012/0085601 | A1 | 8/2012 | Oyama et al. | |
| 2014/0262200 | A1* | 9/2014 | Sheppard | F28D 1/0333 165/297 |
| 2015/0185738 | A1 | 7/2015 | Qiu et al. | |

FOREIGN PATENT DOCUMENTS

| | | |
|---|---|---|
| CN | 102224367 A | 10/2011 |
| CN | 102449570 A | 5/2012 |
| CN | 102954199 A | 3/2013 |
| CN | 103573958 A | 2/2014 |
| CN | 103671854 A | 3/2014 |
| CN | 103867692 A | 6/2014 |
| CN | 204943001 U | 1/2016 |
| EP | 0 947 676 A2 | 10/1999 |
| KR | 10-2015-0038523 A | 4/2015 |
| WO | WO 2010/137214 A2 | 12/2010 |
| WO | WO-2014023157 A1 * | 2/2014 ............ F01M 5/007 |
| WO | WO 2014/082474 A1 | 6/2014 |

OTHER PUBLICATIONS

PCT/CN2017/080043, Jul. 18, 2017, International Search Report.
Extended European Search Report for European Application No. 17785354.6, dated Nov. 20, 2019.
First Office Action for Korean Application No. 10-2018-7025777, dated Nov. 29, 2019.
First Office Action for Chinese Application No. 201610257372.1, dated Dec. 20, 2018.
First Office Action for Chinese Application No. 201610256981.5, dated Mar. 11, 2019.
International Search Report dated Jul. 18, 2017 in connection with International Application No. PCT/CN2017/080043.
EP17785354.6, Nov. 20, 2019, Extended European Search Report.
KR10-2018-7025777, Nov. 29, 2019, First Office Action.
CN201610257372.1, Dec. 20, 2018, First Office Action.
CN201610256981.5, Mar. 11, 2019, First Office Action.

* cited by examiner

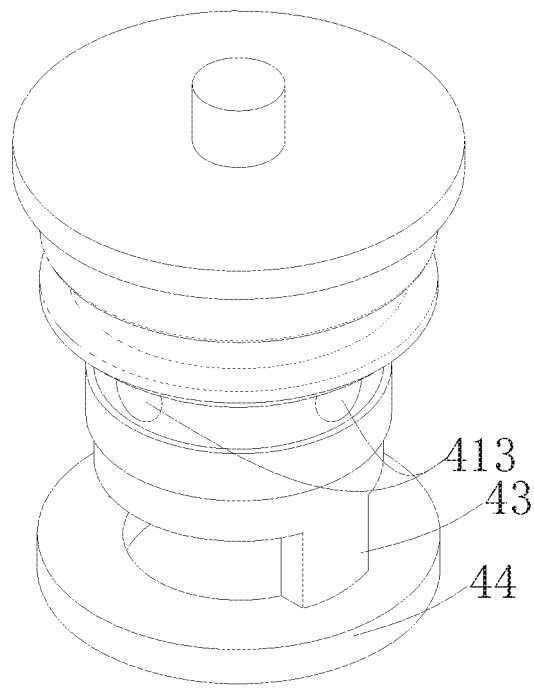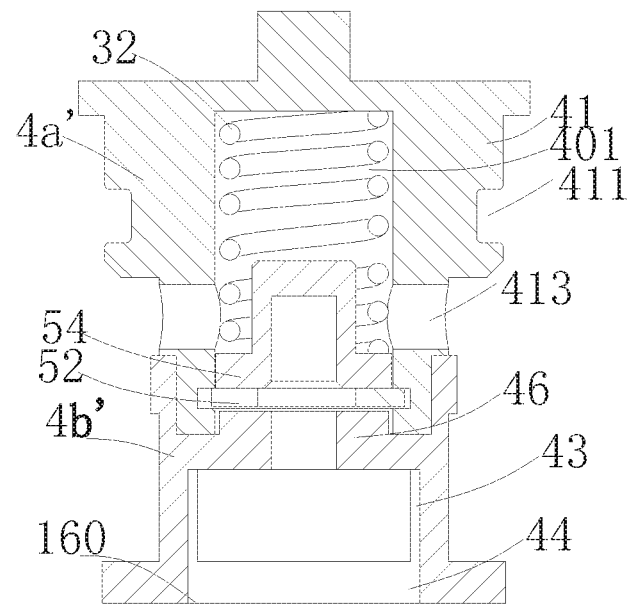
Fig. 9a  Fig. 9b
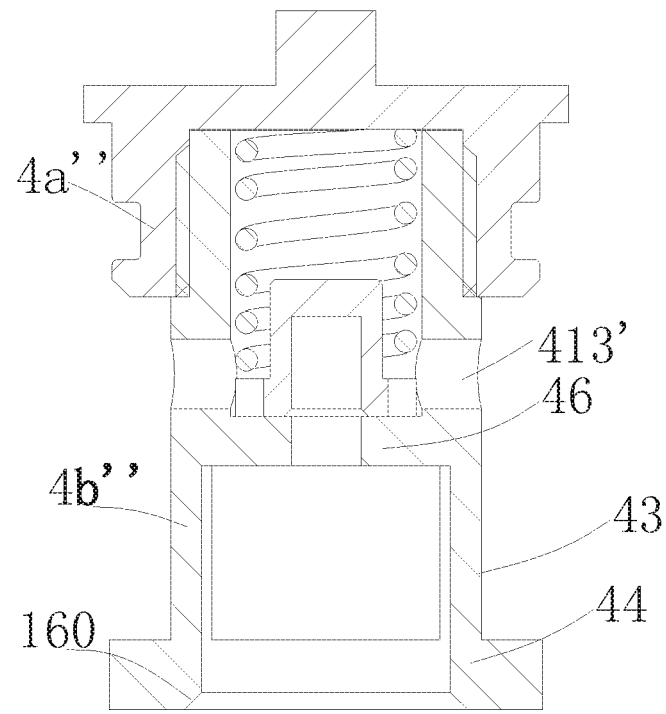
Fig. 10

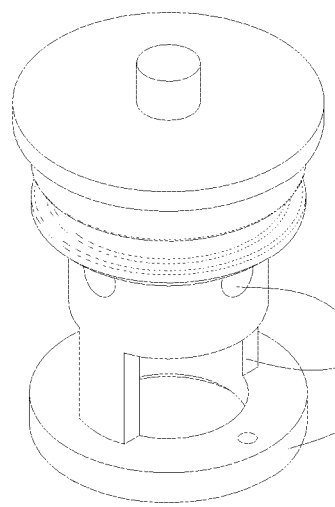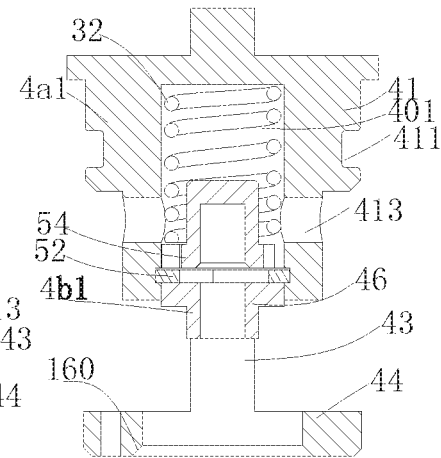
Fig. 13a     Fig. 13b
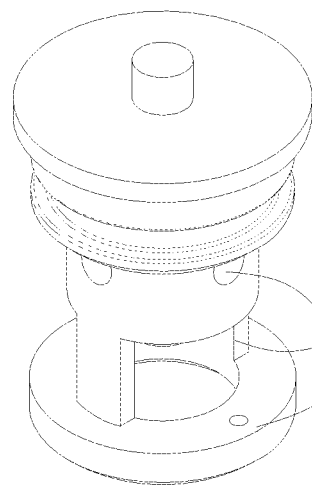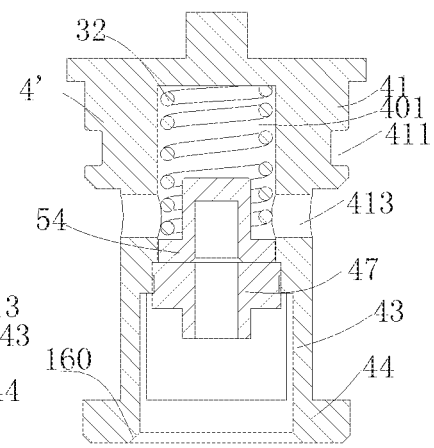
Fig. 14a     Fig. 14b

US 11,408,327 B2

THERMOSTAT AND TEMPERATURE CONTROL SYSTEM

This application is a national stage filing under 35 U.S.C. 371 of International Application No. PCT/CN2017/080043, filed on Apr. 11, 2017, which claims priorities to Chinese Patent Application No. 201610257372.1, filed on Apr. 21, 2016 with the State Intellectual Property Office of People's Republic of China, and Chinese Patent Application No. 201610256981.5, filed on Apr. 21, 2016 with the State Intellectual Property Office of People's Republic of China. The entire contents of these applications are incorporated herein by reference in their entirety.

FIELD

The present application relates to the field of fluid control, and in particular to a thermostatic valve and a temperature control system.

BACKGROUND

When a vehicle is running, various components need to be lubricated timely by lubricating oil, to ensure normal operation of the vehicle. If the lubricating oil does not have a good lubricating property, a service life of the vehicle may be adversely affected. The lubricating property of the lubricating oil has a great relationship with the temperature of the lubricating oil. When the temperature of the lubricating oil is excessively high or excessively low, the lubricating property of the lubricating oil may be adversely affected.

The lubricating oil generally may not have a too high temperature when the vehicle is normally running. In the case that the vehicle is overloaded or is set in a four-wheel drive mode to run in snow or run cross country, the vehicle is running in a state that a hydraulic torque converter slips excessively, which may cause the temperature of a transmission oil to be excessively high, thus degrading the lubricating property.

The function of adjusting the temperature of the gearbox oil is mainly achieved by a temperature control flow passage constituted by a thermostatic valve and an external heat exchanging device for cooling. In the case that the temperature in an oil path of the gearbox rises, a heat sensitive material of a thermal actuator expands due to being heated, and thus a passage for the gearbox oil to directly flow back to the gearbox is closed or a flow rate of the passage is decreased, and the oil with a high temperature enters into the external heat exchanging device for cooling, and then the cooled oil flows back to the gearbox. On the contrary, in the case that temperature of the oil is too low, the heat sensitive material in the thermal actuator begins to solidify and shrink, and a valve rod is reset, thus the passage for the gearbox oil to directly flow back to the gearbox is opened. The oil in the oil path of the gearbox exchanges heat with a heat generating element of the gearbox during flowing process, to control the temperature of the oil within an appropriate range.

SUMMARY

The technical solution of the present application is to provide a thermostatic valve with a relatively simple structure, such that the thermal actuator of the thermostatic valve is not shaken heavily even if the pressure of the fluid is high during an operation of the thermostatic valve.

A thermostatic valve is provided, which includes a valve body in which a chamber is provided, an end cap assembly, a thermal actuator and a first spring mounted in the chamber. The valve body is provided with at least three ports for communicating with outside, the three ports include a first port, a second port and a third port. The thermal actuator includes a valve rod and a body portion. The chamber includes a first chamber and a second chamber, the second chamber is smaller than the first chamber, and the second chamber is away from the end cap assembly relative to the first chamber. The first port is in communication with the first chamber, the third port is in communication with the second chamber, and the first spring is partially or totally located in the second chamber. The thermal actuator is mostly or totally located in the first chamber, the first chamber is larger than the thermal actuator. One end of the thermal actuator abuts against or indirectly abuts against or supports an end of the first spring close to the thermal actuator, and another end of the thermal actuator is limited to the end cap assembly. The thermostatic valve is further provided with a guide portion in the chamber. The thermal actuator includes a guide fitting portion fitting with the guide portion, and the guide portion is slidably fitted with the guide fitting portion.

BRIEF DESCRIPTION OF THE DRAWINGS

FIG. 9a and FIG. 9b are respectively a schematic perspective view and a schematic sectional view of an end cap assembly of a thermostatic valve according to another embodiment of the present application.

FIG. 10 is a schematic sectional view of an end cap assembly of a thermostatic valve according to another embodiment of the present application.

FIG. 13a and FIG. 13b are respectively a schematic perspective view and a schematic sectional view of an end cap assembly of a thermostatic valve according to another embodiment of the present application.

FIG. 14a and FIG. 14b are respectively a schematic perspective view and a schematic sectional view of an end cap assembly of a thermostatic valve according to another embodiment of the present application.

DETAILED DESCRIPTION OF EMBODIMENTS

Figure 1:
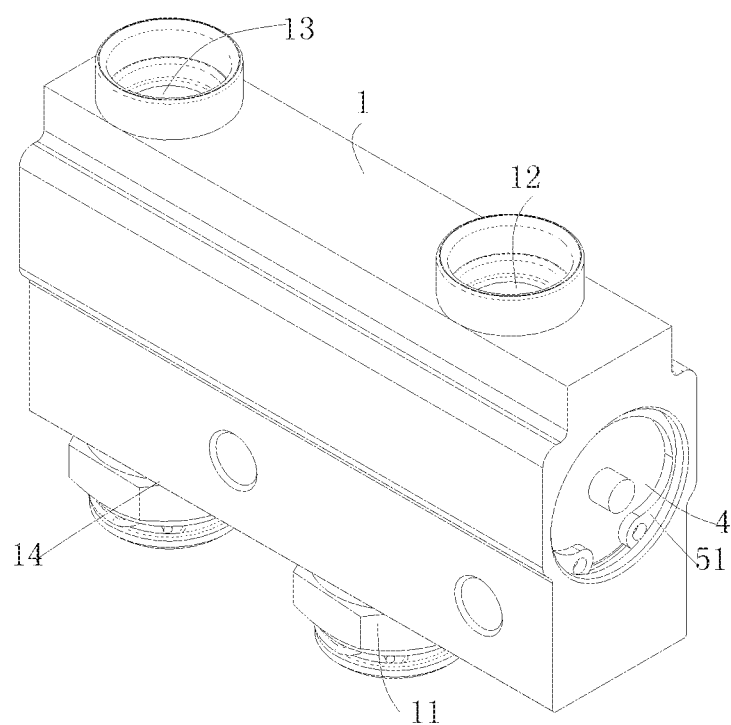
FIG. 1 is a perspective schematic view of a thermostatic valve according to an embodiment of the present application.
Figure 2:
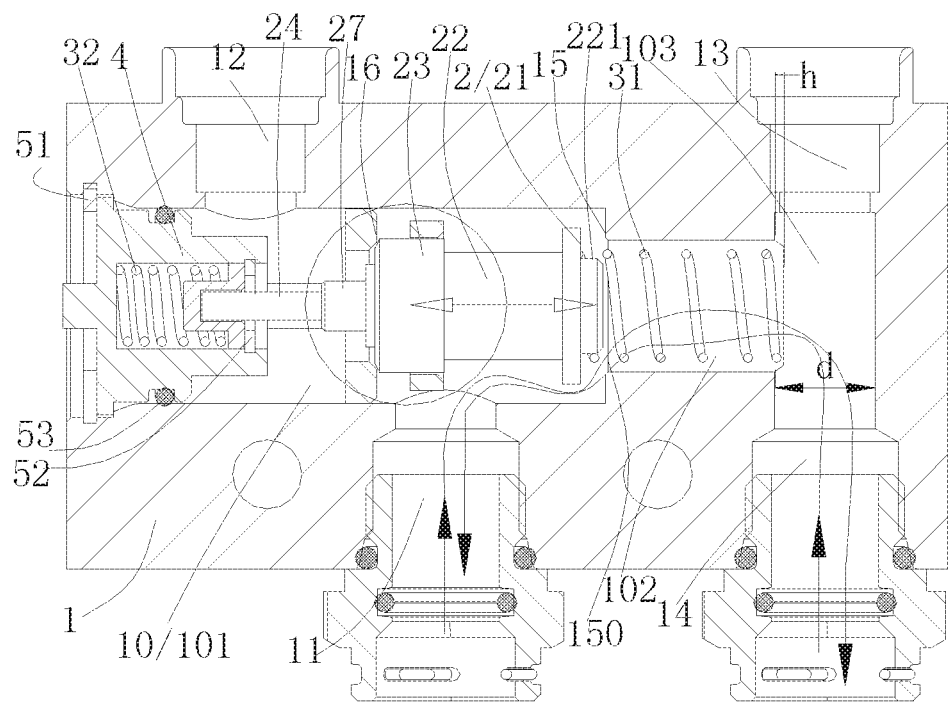
FIG. 2 is a schematic sectional view of the thermostatic valve show FIG. 1 in an operating state.
Figure 3:
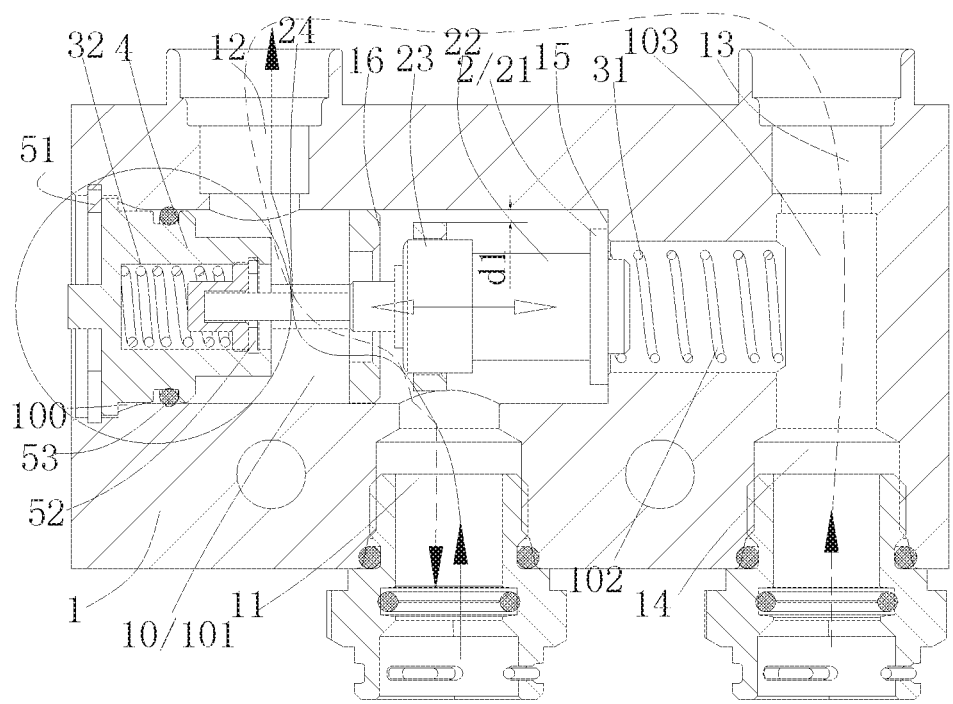
FIG. 3 is a schematic sectional view of the thermostatic valve shown in FIG. 1 in another operating state.
Figure 4:
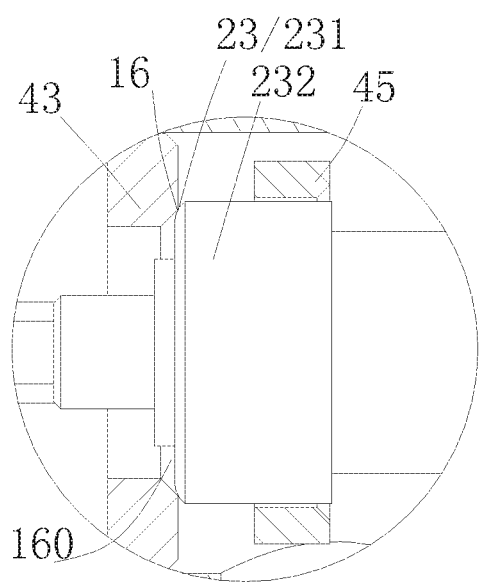
FIG. 4 is a schematic partially enlarged view of the thermostatic valve in FIG. 2.
Figure 5:
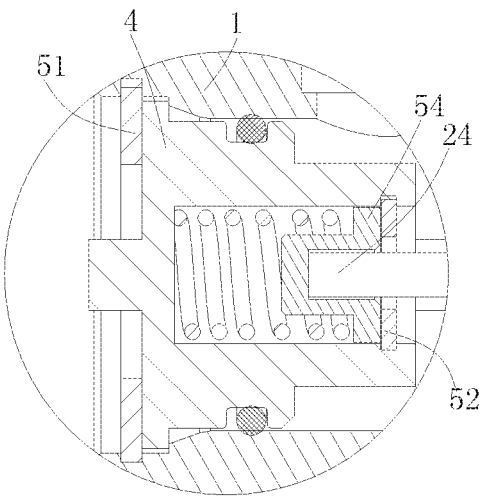
FIG. 5 is a schematic partially enlarged view of the thermostatic valve in FIG. 3.
Figures 6A, 6B:
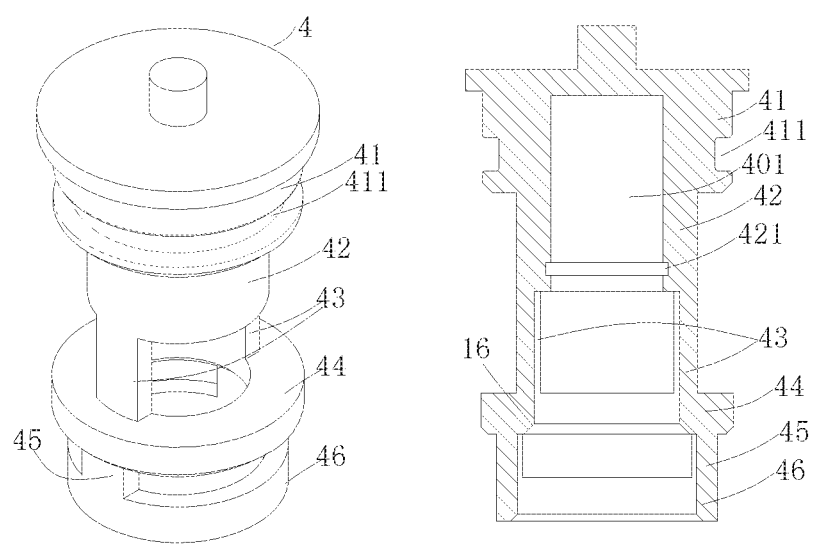
FIG. 6a and FIG. 6b are respectively a schematic perspective view and a schematic sectional view of the end cap shown in FIG. 2 and FIG. 3.
Figure 7:
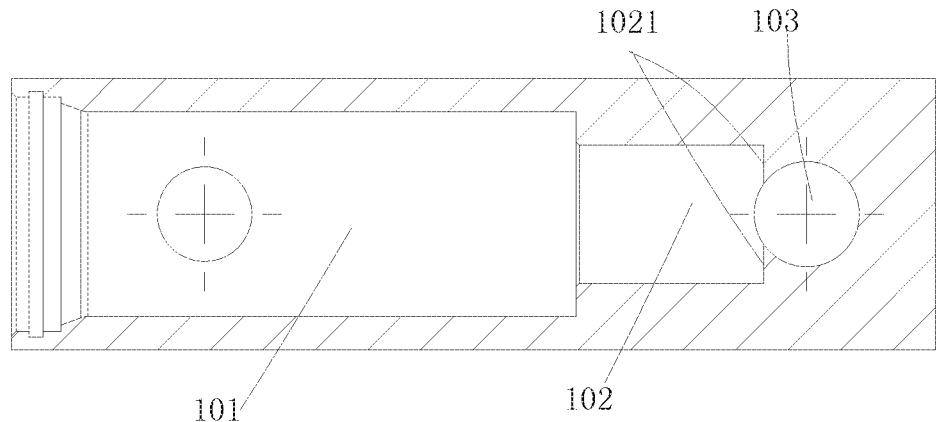
FIG. 7 is a schematic sectional view of the valve body in FIG. 2 and FIG. 3.

The technical solutions of the present application are specifically described below with reference to the accompanying drawings and specific embodiments. FIG. 1 to FIG. 7 are respectively schematic diagrams according to an embodiment. FIG. 1 is a schematic perspective view of the thermostatic valve. FIG. 2 is a schematic sectional view of the thermostatic valve in an operating state. FIG. 3 is a schematic sectional view of the thermostatic valve in another operating state. FIG. 4 is a schematic partially enlarged view of FIG. 2. FIG. 5 is a schematic partially enlarged view of FIG. 3. FIG. 6a and FIG. 6b are respectively a schematic perspective view and a schematic sectional view of an end cap of the thermostatic valve. FIG. 7 is a schematic sectional view of the valve body in the embodiment.

An initial deformation force described in this specification refers to a pressure acting on an elastic element, which is in a compressed condition when a product is not used, in the case that an external force acts on the elastic element and the elastic element tends to deform. The locality terms such as "top", "bottom", "left", "right" described in this specification are each defined according to respective locality relationship determined taking the end cap assembly as an upper side and taking a center axis of a chamber of the thermostatic valve as a center or respective locality relationship in the drawings.

The thermostatic valve includes a valve body 1 within which a chamber 10 is provided and a thermal actuator 2 mounted in the chamber 10. The thermostatic valve further includes a first spring 31 and an end cap assembly. The valve body 1 is provided with at least three ports for communicating with the outside. The three ports include a first port 11, a second port 12 and a third port 13. An end of the chamber 10 is open, and this open end 100 is configured to arrange the end cap assembly. In the technical solution, the other end of the valve body opposite to the end cap assembly is not provided with any opening, such that the processing process of the valve body may be simplified. The first spring 31 is first assembled into the chamber 10, and the thermal actuator 2 is assembled into the chamber 10 through the open end 100 of the chamber 10, and then the end cap assembly is assembled into the open end 100 of the chamber 10. The end cap assembly and the valve body are arranged relatively fixedly. In the present embodiment, a second retainer ring 51 is clamped in a groove of the open end 100 to achieve a position limitation in one direction, such that the end cap assembly cannot move outwards to disengage. In addition, the end cap assembly is limited by a step portion of the open end, such that the end cap assembly cannot further move into the chamber, thereby achieving a relative fixing. The thermal actuator 2 is arranged in the chamber 10 and abuts against the first spring 31 through the end cap assembly. The chamber 10 includes a first chamber 101 and a second chamber 102. The second chamber 102 is smaller than the first chamber 101 so as to form a step portion therebetween. The step portion serves as a first valve seat 15 of the thermostatic valve and forms a first valve port 150. The first chamber 101 is larger than the thermal actuator 2, and the phrase "the first chamber is larger than the thermal actuator" herein means that each portion of the first chamber fitting with the thermal actuator is larger than a corresponding portion of the thermal actuator, such that the thermal actuator may move within a certain range in the chamber, that is, a moving stroke of the thermal actuator, and it is not necessary that all portions of the entire first chamber are larger than any portion of the thermal actuator. One end of the first spring 31 abuts against a bottom of the second chamber, and the other end of the first spring 31 abuts against a first valve core 21 and is sleeved on an end portion 221 of a body 22 of the thermal actuator. The first port 11 and the second port 12 are in communication with the first chamber 101. An axial position of the first port 11 in communication with the first chamber 101 is different from an axial position of the second port 12 in communication with the first chamber 101. The valve body 1 is further provided with a third chamber 103 with an axial direction different from the axial direction of the chamber 10. The axial direction of the third chamber is substantially perpendicular to the axial direction of the chamber 10. The third port 13 is in communication with the second chamber 102 through the third chamber 103. In addition, in this embodiment, the valve body further includes a fourth port 14 in communication with the outside. The fourth port 13 is arranged opposite to the third port 14. The fourth port 13 and the third port 14 may also be arranged at the same side, which just may increase a height of the valve body. In other cases, the fourth port 13 and the third port 14 may also be arranged on two adjacent sides, respectively. Both the fourth port 13 and the third port 14 are in communication with the third chamber 103. The first port 11 and the second port 12 may be arranged at opposite positions of the valve body and may be arranged at different positions in the axial direction. Similarly, the fourth port 13 and the third port 14 may be arranged at opposite positions of the valve body, and the first port 11 is arranged at the same side as one of the fourth port 13 and the third port 14, and the second port 12 is arranged at the same side as the other one of the fourth port 13 and the third port 14. It is to be noted that the fourth port 14 may not be arranged, the purpose of arranging the fourth port 14 is only to facilitate the connection and mounting of pipelines of the thermostatic valve.

The thermal actuator 2 includes a body 22 of the thermal actuator, a valve rod 24 and a heat sensitive material filled in the thermal actuator. The volume of the heat sensitive material may change with a change of the temperature, and the volume of the heat sensitive material changes to push the valve rod to move, such that the valve rod is urged to move relative to the body of the thermal actuator. The body 22 further includes a first outer wall portion 23. In this embodiment, the first outer wall portion serves as a second valve core. The thermal actuator 2 further includes a first valve core 21 relatively fixed on the body 22 of the thermal actuator. The first valve core 21 is arranged opposite to the first valve port 150 or toward the first valve port 150. Under a certain condition, when the thermal actuator 2 moves in a direction of the first valve port indicated by dotted arrow in the figure, the first valve port 150 may be blocked. The thermal actuator 2 is further provided with a first outer wall portion 23 on the other side opposite to the first valve core 21. The first outer wall portion 23 is relatively close to the valve rod 24. The end cap assembly is further provided with a second valve seat 16. A through hole of the second valve seat 16 forms a second valve port 160. The first outer wall portion 23 includes a second valve core 231 on a side relatively close to the valve rod that may be used to block the second valve port 160. The second valve core 231 is relatively fitted with the second valve port. Under a certain condition, when the thermal actuator 2 moves in a direction of the second valve port shown by the dotted arrow in the figure, the second valve port 160 is blocked. The first valve core 21 may be formed integrally with the body 22, and may also be arranged on the body 22 in a fixed manner, for example, in a manner of tight fitting and position-limiting, or for example, a limiting step is provided on the body to prevent the first valve core 21 from moving toward the first outer wall portion.

The end cap assembly includes an end cap 4, a spring seat 54, a first retainer ring 52 and a second spring 32. The end cap 4 is provided with an accommodating chamber 401. The second spring 32 is located in the accommodating chamber 401, and the first retainer ring 52 is retained in a groove of the accommodating chamber. The spring seat 54 is limited to the accommodating chamber 401 by the first retainer ring 52. One end of the second spring 32 abuts against the accommodating chamber 401, and the other end of the second spring 32 abuts against the spring seat 54. The spring seat has a cap-like structure. The spring seat is sleeved on an end portion at the top of the valve rod 24, and the end portion at the top of the valve rod 24 extending into the spring seat is located in an inner chamber of the spring seat. The end of the second spring 32 abutting against the spring seat 54 abuts against an outer extension of the spring seat. The second spring 32 is in a compressed state. An initial deformation force of the second spring 32 is greater than an initial deformation force of the first spring 31, and the initial deformation force of the second spring 32 is greater than an elastic force generated by the deformation of the first spring 31 when the thermal actuator contacts and shuts off the first valve port.

The end cap assembly includes a body portion 41, a valve seal portion 44, a guide portion 46, a second connection portion 45 and a first connection portion 43. The body portion is provided with a groove 411 at the outer side for arranging a sealing member, such that the body portion of the end cap assembly is fitted with the open end 100 of the chamber 10 for seal. At least one groove 411 for arranging the sealing member may be arranged on the outer circumferential side of the body portion 41 of the end cap, and the accommodating chamber 401 for placing the second spring is arranged inside the body portion 41 of the end cap. In this way, after the end cap assembly is fitted with the valve body, a sealing member 53 may be arranged between the end cap assembly and the valve body to increase the sealing performance between the end cap assembly and the valve body. In this embodiment, the body portion 41, the valve seat portion 44, the guide portion 46, the second connection portion 45 and the first connection portion 43 are all arranged on the end cap 4. The second connection portion 45 and the first connection portion 43 respectively have a columnar structure. The number of the columnar structures may also be two or more. The guide portion and the valve seat portion may respectively have a substantially annular structure. An inner hole of the valve seat portion may be smaller than an inner hole of the guide portion, and an outer diameter of the valve seat portion may be greater than that of the guide portion. The body portion 41 is provided with a groove 411 for arranging a sealing member. A groove 421 for retaining the first retainer ring 52 is provided at a position of the accommodating chamber 401 relatively close to the first connection portion 43. The body portion 41 and the valve seat portion 44 are connected by the first connection portion 43. The guide portion 46 and the valve seat portion 44 are connected by the second connection portion 45. In this embodiment, the second valve seat 16 is located at the valve seat portion 44, and the inner diameter of the valve seat portion 44 is smaller than the inner diameter of the guide portion 46, the inner diameter of the guide portion 46 is slightly greater than the first outer wall portion 23 of the thermal actuator 2. Specifically, the inner diameter of the guide portion 46 is larger than the outer diameter of the first outer wall portion 23 of the thermal actuator 2 by 0.05 mm to 0.5 mm, such a guide fitting is achieved between the guide portion 46 and the thermal actuator 2. That is, in this embodiment, the first outer wall portion also serve as a guide fitting portion fitting with the guide portion, and the first outer wall portion is larger than or equal to other portions of the body portion of the thermal actuator. In addition, the guide fitting portion may also be arranged at another outer wall portion of the body portion, such as a second outer wall portion that is slightly smaller than the first outer wall portion and is located between the first outer wall portion and the first valve core. In addition, the inner diameter of a portion of the end cap assembly fitting with the end portion of the valve rod of the thermal actuator is larger than the end portion of the valve rod of the thermal actuator by about 0.05 mm to 0.5 mm. The valve rod may have a columnar stricture overall, such that the end portion of the valve rod indicates the outer diameter of the valve rod. When the thermal actuator moves in a direction indicated by the dotted arrow in the figure, the thermal actuator achieves a preliminary positioning through the end portion of the valve rod and the inner chamber of the spring seat where the end portion of the valve rod is located. In addition, the thermal actuator achieves a good guiding positioning by using the first outer wall portion 23 as a guide fitting portion to slidably fit with the guide portion 45 of the end cap assembly. In addition, the retainer ring described above may also be achieved by a snap ring. In addition, a gap between the guide portion of the end cap assembly and the thermal actuator at the guide portion may be slightly smaller than a gap between a portion of the end cap assembly fitting with the valve rod of the thermal actuator, such that the thermal actuator can operate more stably. Especially, in a case where the inlet is arranged at the first port, the thermal actuator is not easily shaken by the pressure of incoming fluid.

The second chamber 102 is arranged in communication with the third chamber 103 to form a pair of shoulders 1021 for abutting against the spring. In this embodiment, the two chambers are substantially vertical to each other, and at least a part of a bottom of the second chamber 102 extends into the third chamber 103, a depth of the bottom of the second chamber 102 extending into the third chamber 103 is not too deep, so as not to affect the flow of fluid in the third chamber. A depth h of the bottom of the second chamber 102 extending into the third chamber 103 is less than or equal to ¼ of the diameter d of the third chamber, that is $h \leq \frac{1}{4}d$.

In a specific use, the thermostatic valve may be externally connected to an external heat exchanger as a cooling device and an oil tank of a gearbox through a pipeline and/or a connection member. For example, the first port 11 is connected to an oil circuit outlet of the gearbox, and the second port 12 and the third port 13 are respectively connected to the inlet and the outlet of the heat exchanger for cooling the fluid in the gearbox. In the case that the thermostatic valve has only three ports, when the temperature of the oil in the gearbox is low, the heat sensitive material in the thermal actuator shrinks, and the valve rod retracts toward the body, and correspondingly the body of the thermal actuator moves toward the second valve port 160 until the second valve core 231 abuts against the valve seat portion 44 and seals the second valve port 160. In this way, the oil flows, in a direction indicated by the solid arrow in FIG. 2, into the thermostatic valve from the first port 11 and passes through the first valve port 150 and the third port 13, then flows back to the gearbox without being cooled by the heat exchanger. In the case that the thermostatic valve includes three ports, the oil flows out from the third port 13 and flows back to the gearbox. When the temperature of the fluid in the gearbox such as oil is high, the heat sensitive material in the thermal actuator 2 expands due to being heated, and the body 41 of the thermal actuator moves toward the first valve port 150 until the first valve core abuts against the first valve seat and seals the first valve port 150. In a direction indicated by the solid arrow in FIG. 3, the oil flows into the thermostatic valve from the first port 11 and passes through the second valve port 160 and the second port 12 to flow into the heat exchanger of the system to dissipate heat. The cooled oil flows back to the gearbox from the outlet of the heat exchanger. In this way, the temperature of the oil is controlled within an appropriate range.

In the case that the thermostatic valve includes four ports, the first port 11 may be in communication with the fluid outlet such as the oil circuit outlet of the gearbox, and the second port 12 and the third port 13 are respectively in communication with the inlet and the outlet of the heat exchanger for cooling the fluid in the gearbox. The fourth port 14 is in communication with the fluid inlet of the gearbox, and the communication may be implemented through a pipeline, a connection member, a direct connection or the like. When the temperature of the fluid in the gearbox is high, the heat sensitive material in the thermal actuator 2 expands due to being heated, the body 41 of the thermal actuator moves towards the first valve port 150 until the first valve core 21 seals the first valve port 150. In a direction indicated by the solid arrow in FIG. 3, the fluid flows into the first chamber 101 of the thermostatic valve from the first port 11 and passes through the second valve port 160 and the second port 12 to flow into the heat exchanger of the system to dissipate heat. The cooling fluid after heat dissipation flows from the outlet of the heat exchanger and passes through the third port 13, the third chamber 103 and the fourth port 14, then flows back into the gearbox. When the temperature of the oil in the gearbox is low, the heat sensitive material in the thermal actuator shrinks, and the body of the thermal actuator moves toward the second valve port 160 until the second valve core 231 abuts against the valve seat portion 44 to block the second valve port 160. In this way, in a direction indicated by the solid arrow in FIG. 2, the fluid flows into the thermostatic valve to reach the first chamber from the first port 11 and passes through the first valve port 150, the second chamber 102, the third chamber 103 and the fourth port 14, then flows back into the gearbox without being cooled by the heat exchanger. In this way, the temperature of the oil is controlled within an appropriate range.

Figure 8:
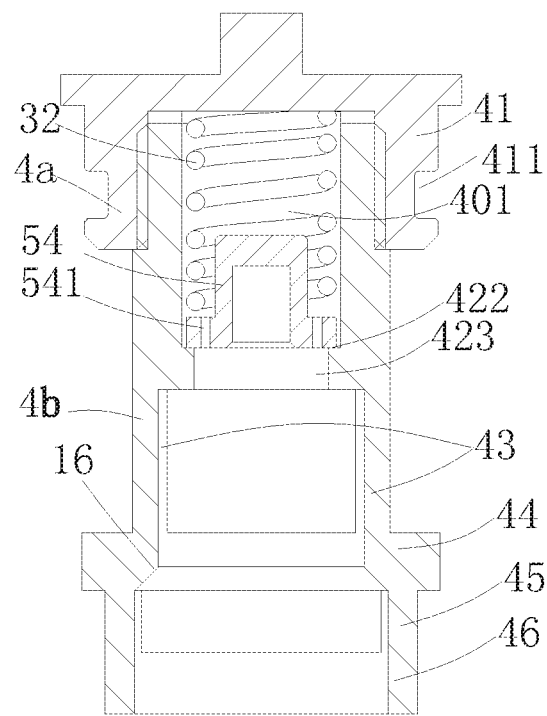
FIG. 8 is a schematic sectional view of an end cap assembly of a thermostatic valve according to another embodiment of the present application.

Another embodiment is described as follows. As shown in FIG. 8, a main difference between this embodiment and the above embodiments is the structure of the end cap assembly. The end cap assembly is not provided with the retainer ring, and the end cap assembly includes a second spring 32, a cap body 4a and a seat body 4b. The cap body 4a and the seat body 4b are fitted through threads to form an end cap. The cap body 4a and the seat body 4b are fitted with each other to form an accommodating chamber 401 for placing the second spring 32 and the spring seat 54. The seat body 4b is provided with a step portion for abutting against the spring seat 54. The second spring 32 is located in the accommodating chamber 401. The spring seat 54 is limited to the accommodating chamber 401 by the step portion 422 so as not to disengage from the chamber. One end of the second spring 32 abuts against the cap body 4a, and the other end of the second spring 32 abuts against the spring seat 54. The spring seat has a cap-like structure. The cap body 4a is fitted and sealed with the open end 100 of the chamber 10, and at least one groove 411 for arranging a sealing member may be further arranged on the outer peripheral side of the cap body 4a. The end cap assembly also includes the body portion 41, the valve seat portion 44, the guide portion 46, the second connection portion 45 and the first connection portion 43. The spring seat 54 may further provided with a balance hole 541. The accommodating chamber 401 is in communication with the chamber 10 of the thermostatic valve through the balance hole 541 and a hole 423 below the accommodating chamber. After the end cap assembly is fitted and mounted with the valve body, a sealing member 53 may be arranged between the end cap assembly and the valve body, to increase the sealing performance between the end cap assembly and the valve body. In this embodiment, the body portion 41 is arranged at the cap body 4a. The valve seat portion 44, the guide portion 46, the second connection portion 45 and the first connection portion 43 are all arranged on the seat body 4b. Similarly, the second valve seat 16 is located at the valve seat portion 44. The inner diameter of the valve seat portion 44 is smaller than the inner diameter of the guide portion 46. The inner diameter of the guide portion 46 is slightly greater than the first outer wall portion 23 of the thermal actuator 2. Specifically, the inner diameter of the guide portion 46 is greater than the outer diameter of the first outer wall portion 23 of the thermal actuator 2 by about 0.05 mm to 0.50 mm, such that a guide fitting is achieved between the guide portion 46 and the thermal actuator 2. Similarly, the inner diameter of a portion of the end cap assembly fitting with the end portion of the valve rod of the thermal actuator is greater than the end portion of the valve rod of the thermal actuator by about 0.05 mm to 0.50 mm. If the accuracy requirement can be met, the inner diameter of a portion of the end cap assembly fitting with the end portion of the valve rod of the thermal actuator may be greater than the end portion of the valve rod of the thermal actuator by about 0.1 mm to 0.30 mm, such that the thermal actuator operates more stably and reliably. On the one hand, the thermal actuator achieves a preliminary positioning through locating the end portion of the valve rod in the inner chamber of the spring seat, and moreover the thermal actuator achieves a good guide positioning by using the first outer wall portion 23 as a guide fitting portion to be slidably fitted with the guide portion 45 of the end cap assembly. With this solution, the standardization of the cap body can be achieved, and for a thermostatic valve of a different type, only a different seat body is adopted. In addition, one retainer ring may be omitted, which makes the assembly to be convenient. In addition, the seat body may be made of a plastic material by injection molding, such that the processing is more convenient and the weight may be reduced, and waste of the material may also be reduced.

Similarly, the spring seat is sleeved on the top end of the valve rod 24, and a portion of the top rod 24 extending into the spring seat, that is, an end portion at the top, is located inside the inner chamber of the spring seat, and ab end of the second spring 32 abutting against the spring seat 54 abuts against an outer extension of the spring seat, and the second spring 32 is in a compressed state. The initial deformation force of the second spring 32 is greater than the initial deformation force of the first spring 31, and the initial deformation force of the second spring 32 is greater than an elastic force required by the deformation of the first spring 31 when the thermal actuator contact to shut off the first valve port.

The end cap assembly of the thermostatic valve may also be as shown in FIG. 9a and FIG. 9b. In this embodiment, the structure of the end cap assembly is different, and a fitting position of the end cap assembly with the guide portion of the thermal actuator is also different. The end cap assembly includes a second spring 32, a cap body 4a', a seat body 4b', a spring seat 54 and a first retainer ring 52. The cap 4a' includes an accommodating chamber 401 for placing the second spring 32 and the spring seat 54, and the second spring 32 and the spring seat 54 are retained in the accommodating chamber 401 by the first retainer ring 52. One or both of the seat body 4b' and the cap body are provided with a position-limiting structure such as a step portion, such that the seat body assembled with the end cap assembly is limited to move toward the cap body. In addition, a local position of the seat body may be tightly fitted with the first chamber of the valve body to limit the movement of the seat body toward the first valve port, or a portion of the chamber body fitting with the seat body may be provided with a step portion so as to limit the movement of the seat body toward the first valve port in the chamber. In this embodiment, the seat body portion of the end cap assembly includes a body portion 41, a valve seat portion 44, a guide portion 46 and a first connection portion 43. The valve seat portion is larger than the guide portion, and the guide portion is arranged close to the cap body relative to the valve seat portion. The valve seat portion is arranged away from the cap body relative to the guide portion. The first connection portion 43 connects the guide portion and the valve seat portion. The cap body 4a' is also provided with a communication hole 413 for communicating the accommodating chamber 401 with the outside thereof. In the case that the thermostatic valve operates, the first outer wall portion of the thermal actuators no longer serves as a guide fitting portion, but a portion of the valve rod of the thermal actuator is fitted with the hole of the guide portion 46 to achieve a slidable guiding, such that the thermostatic valve can have a reduced length while achieving a good guide performance of movement. For other structures, reference may be made to the above-described embodiments.

The end cap assembly may also be as shown in FIG. 10. Compared with the solution shown in FIG. 8, the guide portion is arranged close to the cap body, and the second connection portion relatively away from the cap body is omitted. The end cap assembly includes the second spring 32, a cap body 4a", a seat body 4b" and the spring seat 54. The cap body 4a" and the seat body 4b" are fitted through threads to form an end cap. The end cap assembly is not provided with the retainer ring. The cap body 4a" and the seat body 4b" are fitted with each other to form an accommodating chamber 401 for placing the second spring 32 and the spring seat 54. In addition, a communication hole 413' is provided to make the accommodating chamber 401 for placing the second spring 32 and the spring seat 54 to be in communication with the outside. The seat body 4b" is provided with a guide portion 46. The guide portion has a through hole. The guide portion is located close to the spring seat and forms a step portion at this position for abutting against the spring seat 54. The second spring 32 is located in the accommodating chamber 401. The spring seat is limited to the accommodating chamber 401 by the step portion, such that the spring seat cannot disengage from the accommodating chamber 401. One end of the second spring 32 abuts against the cap body 4a", and the other end of the second spring 32 abuts against the spring seat 54. The spring seat has a cap-like structure. The cap body 4a" is fitted and sealed with the open end 100 of the chamber 10 by at least one sealing member. When assembling, the second spring 32 and the spring seat are placed at a hole position corresponding to one of the cap body or the seat body, and then are connected with the other one of the cap body and the seat body through threads, such that the initial deformation force of the second spring may be generated by adjusting a thread depth of the threads, and the slidable guiding is achieved by fitting of the guide hole relatively close to the spring seat with the valve rod of the thermal actuator.

Figure 11:
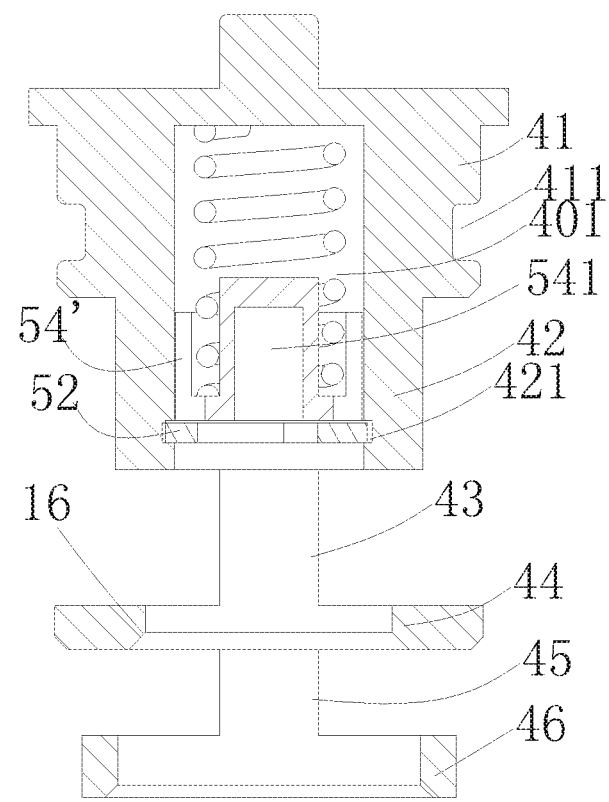
FIG. 11 is a schematic sectional view of an end cap assembly of a thermostatic valve according to another embodiment of the present application.
Figure 12:
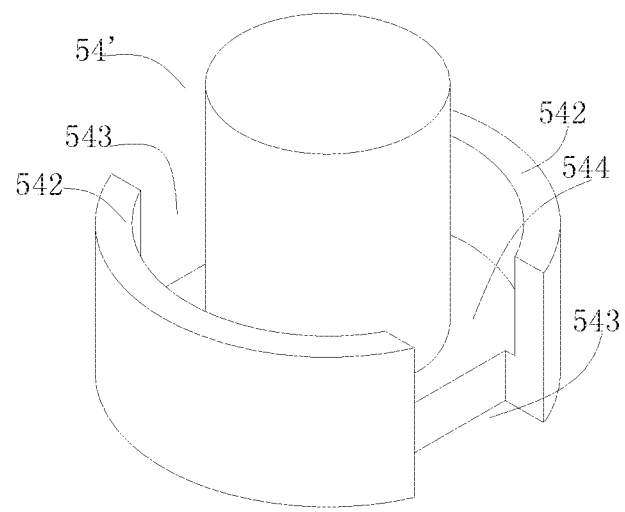
FIG. 12 is a schematic perspective view of a guide member of the end cap assembly in FIG. 11.

The end cap assembly may also be as shown in FIG. 11 and FIG. 12. Compared with the solutions shown in FIG. 1 to FIG. 7, the structure of the spring seat in this solution is different. The spring seat 54' is provided with a gap portion 543 and a limiting portion 542. One end of the second spring is placed in the accommodating portion 544. The accommodating portion 544 has limiting structures on the inner and outer sides thereof. In this way, the spring seat 54' is not inclined during the process of the valve rod of the thermostatic valve driving the spring seat to move, thus the movement of the spring seat is more stable. The gap portion can balance the pressure of the spring seat, and balance the pressure between the chamber where the spring seat is placed and a chamber where the space below the first retainer ring 52 is located.

The end cap assembly may also be as shown in FIG. 13. Compared with the above solutions, the end cap assembly in this solution includes a cap body 4a1 and a seat body 4b1, the second spring 32, the first retainer ring 52 and the spring seat 54. The second spring 32, the first retainer ring 52, the spring seat 54 are arranged together with the cap body 4a1. The second spring 32 and the spring seat 54 are limited to the accommodating chamber of the cap body by the first retainer ring 52 fitting with the groove 401. For details, reference may be made to the above technical solutions. The seat body 4b1 includes a valve seat portion 44, a guide portion 46 and a first connection portion 43. The valve seat portion is larger than the guide portion, and a hole of the valve seat portion is larger than a hole of the guide portion. The guide portion is arranged close to the cap body relative to the valve seat portion, and the valve seat portion is arranged away from the cap body relative to the guide portion. The first connection portion 43 connects the guide portion and the valve seat portion. The cap body 4a1 is further provided with a communication hole 413 for communicating the accommodating chamber 401 with the outside thereof. In the case that the thermostatic valve operates, the first outer wall portion of the thermal actuator no longer serves as the guide fitting portion, but a portion of the valve rod of the thermal actuator is fitted with the hole of the guide portion 46 to achieve the slidable guiding, such that the thermostatic valve has a reduced length while achieving a good guide performance of movement. The seat body may be in a clearance-fit with the cap body. The cap body and the seat body have an axial limiting structure and a radial limiting structure to avoid a radial movement of the seat body and an axial movement towards the cap body. The limitation of the movement of the seat body towards the cap body may be achieved by the first retainer ring 52 as shown in FIG. 13a and FIG. 13b. Alternatively, a step portion may be arranged on the cap body to achieve the axial movement of the seat body toward the cap body. The cap body may also be in a transition-fit or tight fit with the cap body. The seat body may be tightly fitted with the valve body to achieve a limitation of movement toward the interior of the chamber, that is, towards the first valve port, such that the seat body is relatively limited to the chamber 10 of the valve body. The guide portion is also arranged close to the cap body 4a1, and the guide portion and the second connection portion which are relatively away from the cap body are omitted. In addition, the cap body 4a1 and the seat body 4b1 may also be fitted and fixed through threads. When assembling the thermostatic valve, the first spring and the thermal actuator may be assembled first, and then the seat body and the cap body are assembled with the valve body. Besides, the first spring and the thermal actuator may be assembled with the valve body, and then the seat body and cap body are assembled successively. Moreover, the first spring may be assembled first. The assembly in this solution is relatively simply, and others may refer to the above-described embodiments.

The end cap assembly may also be as shown in FIG. 14a and FIG. 14b. Compared with the solutions shown in FIG. 1 to FIG. 7, main differences of this solution are in the structure of the end cap, the limiting way of the spring seat 54 and the fitting guiding structure, and a communication hole further arranged in the accommodating chamber 401 of the end cap. Specifically, the end cap assembly includes an end cap 4', the second spring 32, the spring seat 54 and the guide member 47. The end cap 4' includes a body portion 41, a valve seat portion 44 and a first connection portion 43. At an outer peripheral side of the body portion 41 of the end cap, at least one groove 411 for arranging a sealing member may be provided so as to fit and seal with the open end 100 of the chamber 10 and an accommodating chamber 401 for placing a second spring and the like may also be provided. The guide member and the end cap may be fixed by, for example, welding, thread fastening, tight fitting, interference riveting or a combination of two or more of the fixing manners as listed, such that the spring seat is fixed by the guide member, and the retainer ring may not be used any more. The spring seat 54 abuts against a fixing member 47, thus, after the end cap assembly is fitted and assembled with the valve body, a sealing member 53 may be arranged between the end cap assembly and the valve body, to increase the sealing performance between the end cap assembly and the valve body. In this embodiment, the body portion 41, the valve seat portion 44 and the first connection portion 43 are arranged on the end cap 4, and the guide portion is arranged on the guide member, such that the second connection portion is not required. The body portion 41 and the valve seat portion 44 are connected by the first connection portion 43. In addition, the guide portion 46 is fitted with the valve rod of the thermal actuator for guiding, and the guide portion 46 may also be fitted with the first outer wall portion of the thermal actuator for guiding. The outer diameter of the hole for fitting and guiding is larger than an outer diameter of a portion of the thermal actuator for fitting and guiding by 0.05 mm to 0.5 mm. A gap between the hole of the guide member for fitting and guiding and the portion of the thermal actuator for fitting and guiding may be slightly smaller than a gap between the valve rod of the thermal actuator and a hole of the spring seat. For other structures, reference may be made to the above-described embodiments.

In several embodiments described above, the guide portion of the thermostatic valve has an annular structure. In addition, the guide portion may also have a combined structure of a plurality of column structures, and the thermal actuator does not disengage from the guide portion with the combined structure. For example, the guide portion has a structure similar to a combination of two or more arc-shaped columns, each of which may be a part of the same annular structure. The interior of the guide portion may have an arc-shaped structure fitting with the structure of the thermal actuator. In this way, the guide of the thermal actuator can also be achieved. The length of the guide portion of the end cap assembly fitting with the guide fitting portion of the thermal actuator is greater than a stroke of the thermal actuator in the chamber, for example, by more than 1 mm, such that the thermal actuator is always fitted with the guide portion while moving in the chamber. In addition, in the above embodiments, the guide fitting portion is the first outer wall portion or the valve rod of the thermal actuator. Alternatively, the guide fitting portion may also be a transition portion 27 between the first outer wall portion and the exposed valve rod.

In the above-described embodiments, the first port may be selected as the inlet of the thermostatic valve. The flow modes of the fluid in two different operating conditions are respectively as shown in FIG. 2 or FIG. 3, and the fluid in the thermostatic valve may also flow in directions indicated by the dotted arrows shown in FIG. 2 and FIG. 3, Specially, reference is made to FIG. 15 to FIG. 17, in the case that the thermostatic valve has only three ports, a communication pipe may be provided outside the thermostatic valve, and the flow of fluid into the thermostatic valve from the third port can also achieve the control performance of the thermostatic valve. In addition, in the embodiments described above, the guide portion is arranged at the end cap assembly, and is partially arranged at the end cap. In addition, some of the end cap assemblies may also include the cap body and the seat body, and the guide portion is arranged at the seat body, and the seat body may be assembled with the cap body as an integrated structure. In addition, the seat body and the cap body may also be arranged as separate structures, and form a relatively fixed structure after being assembled into the chamber of the valve body. Specifically, the seat body may be fixed to the end cap or the cap body of the end cap assembly; or may also be fixed through the end cap or the cap body and the valve body.

Figure 15:
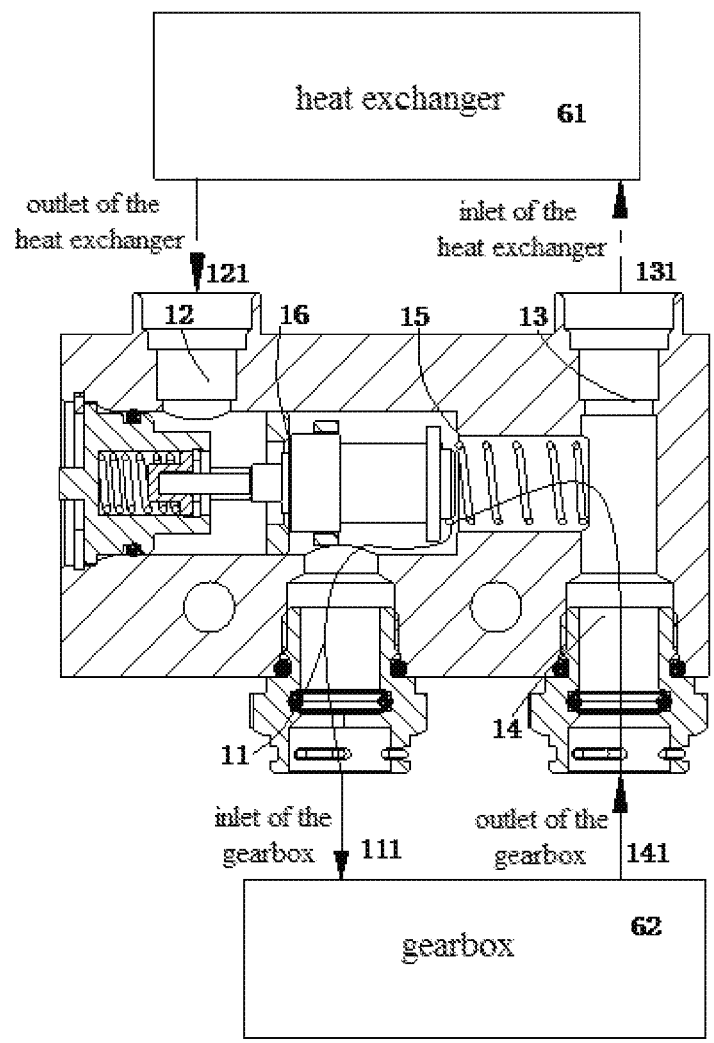
FIG. 15 is a schematic diagram of a manner in which a thermostatic valve according to an embodiment of the present application is applied to a temperature control system in a case of a relative low fluid temperature.
Figure 16:
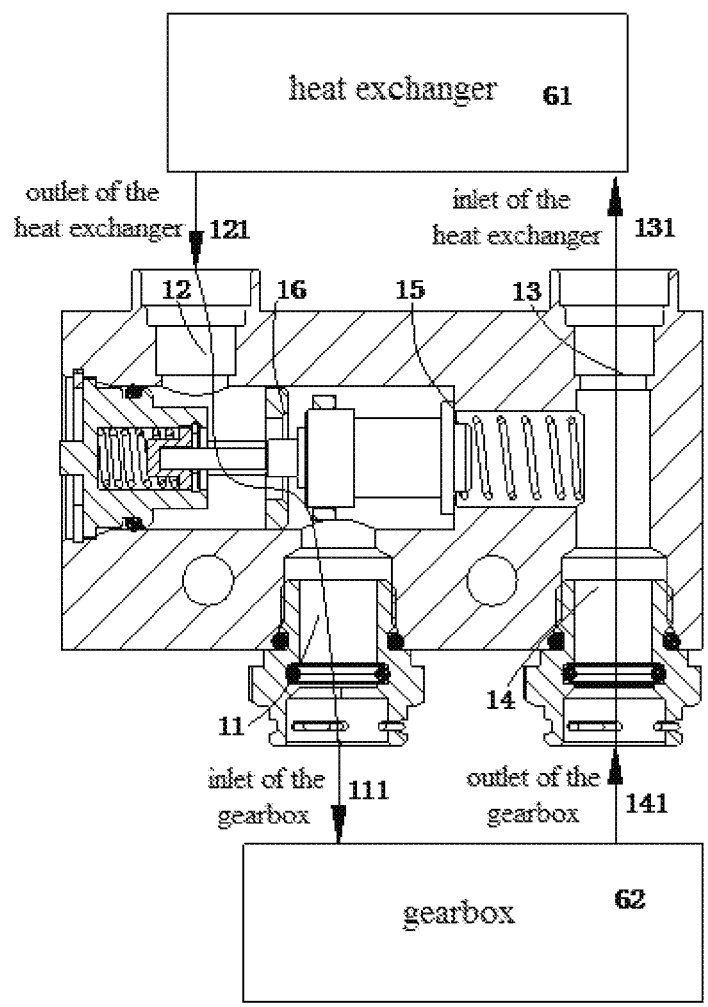
FIG. 16 is a schematic diagram of a manner in which a thermostatic valve according to an embodiment of the present application is applied to a temperature control system in a case of a relative high fluid temperature.
Figure 17:
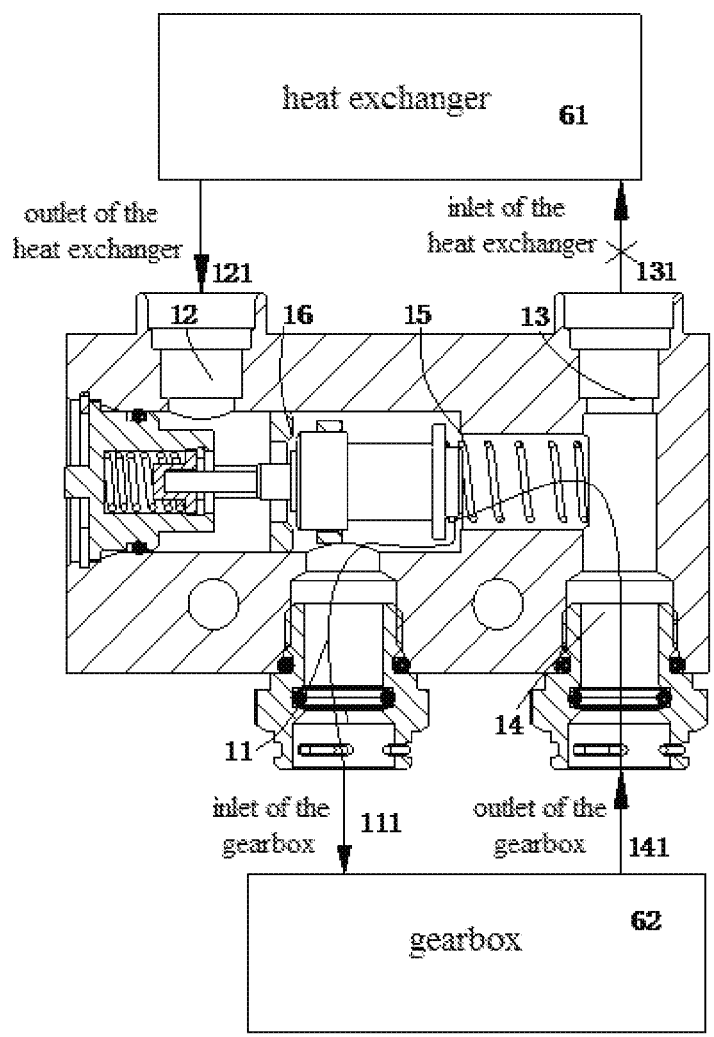
FIG. 17 is a schematic diagram of a manner in which a thermostatic valve according to an embodiment of the present application is applied to a temperature control system in a case of an abnormal pressure relief condition.

The temperature control system shown in FIG. 15 to FIG. 17 is described as an example. FIG. 15 to FIG. 17 are schematic diagrams of a specific application manner of the temperature controller according to the present application in a temperature control system. The temperature control system includes a thermostatic valve, a heat exchanger 61 and a gearbox 62. In this embodiment, the thermostatic valve has four ports. Two ports on one side are respectively in communication with an inlet and an outlet of a cooling fluid circuit of the heat exchanger. The other two ports on the same side are respectively in communication with an inlet and an outlet of the cooling fluid circuit of the gearbox. The first port 11 of the thermostatic valve is in communication with the cooling fluid inlet of the gearbox, and the fourth port 14 of the thermostatic valve is in communication with the cooling fluid outlet of the gearbox. The second port 12 of the thermostatic valve is in communication with the cooling fluid outlet of the heat exchanger, and the third port 13 of the thermostatic valve is in communication with the cooling fluid inlet of the heat exchanger. The first port and the fourth port are located on a side of the thermostatic valve relatively close to the gearbox, and the second port and the third port are located on the other side of the thermostatic valve relatively close to the cooling box. When the temperature of the oil in the gearbox is high, the heat sensitive material in the thermal actuator 2 expands due to being heated, and the body portion 41 of the thermal actuator moves toward the first valve port until the first valve core abuts against the first valve seat and blocks the first valve port. In a direction indicated by the solid arrow in FIG. 16, the fluid flows out from the first fluid port 141 as the fluid outlet of the gearbox and flows into the thermostatic valve from the fourth port 14 of the thermostatic valve. Then, the fluid flows into the first fluid port 131 of the heat exchanger from the third port 13 through the third chamber, the first fluid port 131 serves as the fluid inlet of the heat exchanger. Then, the fluid, after performing heat exchange in the heat exchanger, passes through the second fluid port 121 of the heat exchanger, the second fluid port 121 serves as the fluid outlet of the heat exchanger. The fluid flows into the thermostatic valve through the second port 12, and flows to the first port through the second valve port, then flows back to the gearbox 62 from the first port 11 through the second fluid port 111 of the gearbox. The second fluid port 111 serves as the fluid inlet of the gearbox. The fluid may perform heat exchange in the heat exchanger 61. The heat exchanger may be a cooler, or may be a double-flow heat exchanger. Specifically, the heat exchanger may be a gas-liquid heat exchanging type heat exchanger or a liquid-liquid heat exchanging type heat exchanger. When the temperature of the oil in the gearbox is low, the heat sensitive material in the thermal actuator shrinks, and the body of the thermal actuator body moves toward the second valve port until the second valve element abuts against the second valve seat and blocks the second valve port. In a direction indicated by the solid arrow in FIG. 15, the fluid flows out from the first fluid port 141 of the gearbox and flows into the thermostatic valve from the fourth port 14, and passes through the third chamber and the second chamber 102 communicating with the third chamber. The fluid flows into the first chamber through the opened first valve port and flows out of the thermostatic valve from the first port 11 communicating with the first chamber, then the fluid flows back to the gearbox 62 through the second fluid port 111 serving as the inlet of the gearbox, without performing heat exchange in the heat exchanger, that is, the fluid is not cooled by the heat exchanger. In this way, the oil temperature is controlled within an appropriate range. When the temperature control system is abnormal, the temperature control system operates under an abnormal pressure relief condition. For example, in the case that the pipeline from the fluid inlet of the heat exchanger to the fluid outlet of the heat exchanger is blocked or the circulation of the fluid is not smooth, since the flow resistance increases, the fluid is unable to circulate normally, therefore the fluid flowing out from the outlet of the gearbox has an increased pressure due to the abnormal circulation of the fluid. That is, the pressure in the space where the second chamber and the third chamber of the thermostatic valve are located is increased. The fluid does not flow smoothly or is blocked, the first valve port is closed, and also the first chamber has a relatively low pressure due to communication with the inlet of the gearbox, thus there is a pressure difference between two sides of the first valve port, that is, between the second chamber and the first chamber. When the pressure difference reaches a certain level, for example, in the case that the force generated by the pressure difference is greater than a difference between the deformation force of the second spring at the time and the deformation force of the first spring when the first valve port is shut off, or in a case that the force generated by the pressure difference can overcome the difference between the deformation force of the second spring at the time and the deformation force of the first spring, the thermal actuator of the thermostatic valve moves toward the second valve port under the effect of the pressure difference, that is, the safety pressure relief occurs, such that the failure of the system is avoided, that is, the temperature control system may achieve pressure relief under an abnormal pressure condition. In this way, it is not necessary to separately provide a pressure relief device to achieve the pressure relief, and the structure of the thermostatic valve is relatively simple.

Figure 18:
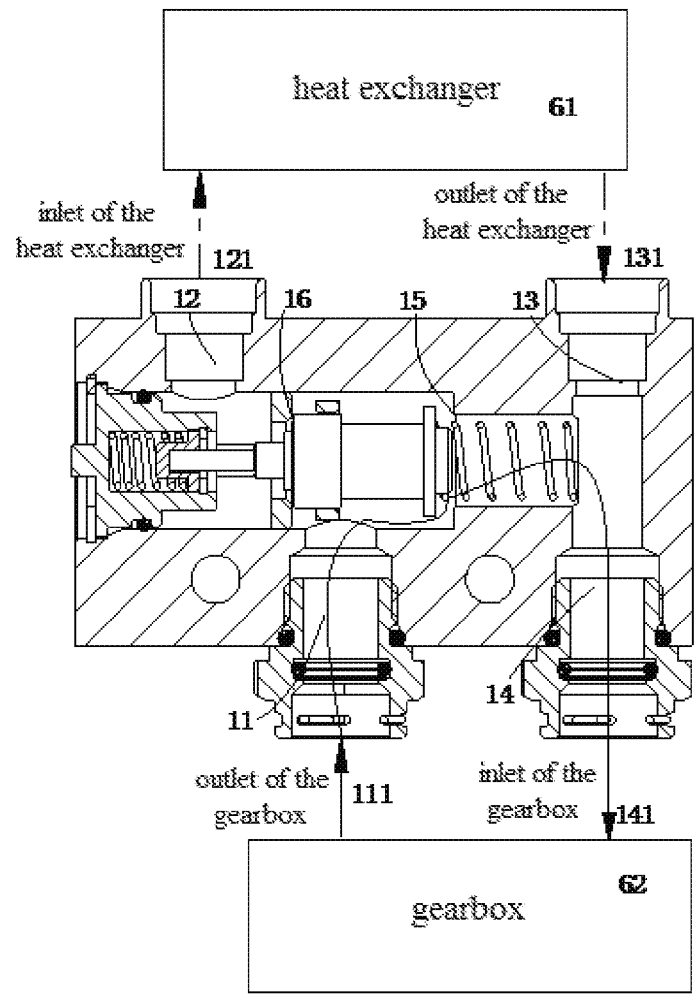
FIG. 18 is a schematic view of another manner in which a thermostatic valve according to an embodiment of the present application is applied to a temperature control system.

In addition, the temperature control system may also be as shown in FIG. 18, which is a schematic diagram of another application manner of the temperature controller in the temperature control system. The temperature control system includes a thermostatic valve, the heat exchanger 61 and the gearbox 62. The thermostatic valve has four ports, in which the two ports on one side, that is the second port and the third port, are respectively in communication with an inlet and an outlet of a cooling fluid circuit of the heat exchanger. The other two ports on the same side, that is, the first port and the fourth port, are respectively in communication with the inlet and the outlet of the cooling fluid circuit of the gearbox. The first port 11 of the thermostatic valve is in communication with the second fluid port of the gearbox. The second fluid port serves as the cooling fluid outlet of the gearbox. The fourth port 14 of the thermostatic valve is in communication with the first fluid port of the gearbox. The first fluid port serves as the cooling fluid inlet of the gearbox. The second port of the thermostatic valve is in communication with the second fluid port of the heat exchanger, and the second fluid port serves as the cooling fluid inlet of the heat exchanger. The third port 13 of the thermostatic valve is in communication with the first fluid port of the heat exchanger. The first fluid port of the heat exchanger at this time serves as the cooling fluid outlet of the heat exchanger, the third port 13 of the thermostatic valve is in communication with the first fluid port of the gearbox, and the first fluid port of the heat exchanger is in communication with the first fluid port of the gearbox. In this way, when the fluid flows into the thermostatic valve from the second fluid port of the gearbox, due to the arrangement of the guide structure of the thermostatic valve, even if a fluid pressure impacts the thermal actuator, the thermal actuator may not be shaken heavily, thereby making the operation more stable. For other structures, reference may be made to the above-described embodiments, which is not repeated here.

Figure 19:
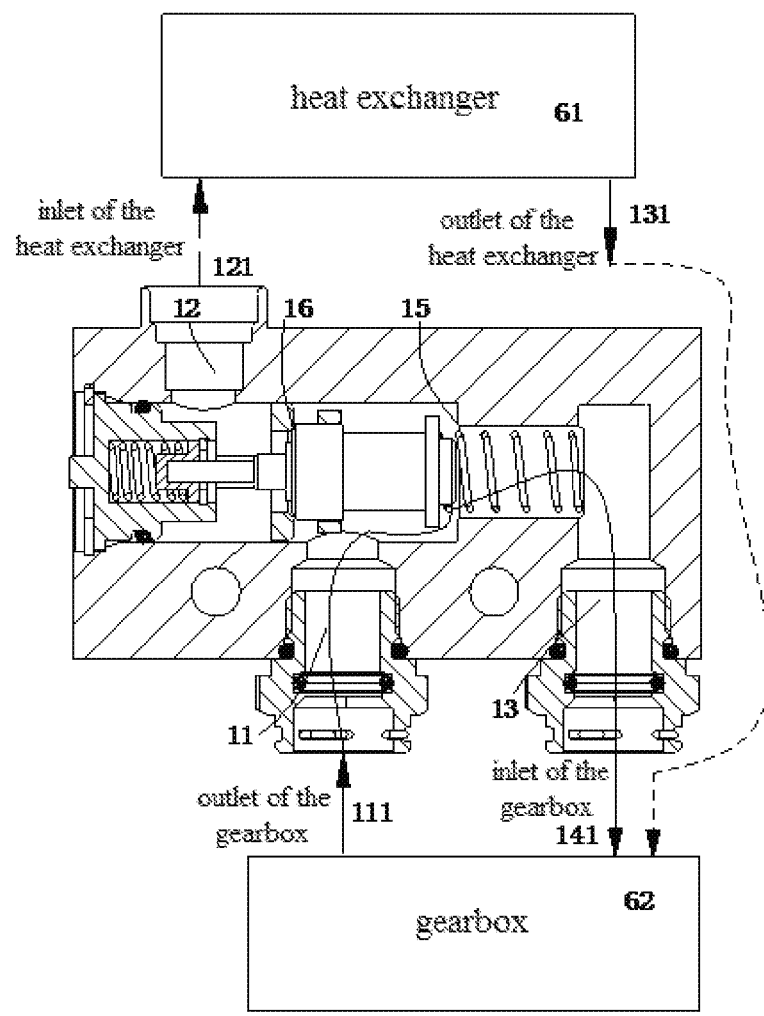
FIG. 19 is a schematic view of yet another manner in which a thermostatic valve according to an embodiment of the present application is applied to a temperature control system.

The temperature control system may also be as shown in FIG. 19, and in this solution, the thermostatic valve has three ports. The first port of the thermostatic valve is in communication with the second fluid port 111 of the gearbox, and the second port of the thermostatic valve is in communication with the second fluid port 121 of the heat exchanger. The first fluid port 131 of the heat exchanger serves as the fluid outlet of the heat exchanger, and the second fluid port 121 of the heat exchanger serves as the fluid inlet of the heat exchanger. The second fluid port of the gearbox serves as a fluid outlet of the gearbox, and the first fluid port 141 of the gearbox serves as a fluid inlet of the gearbox. The third port of the thermostatic valve is in communication with the first fluid port of the gearbox. The first fluid port of the heat exchanger is in communication with the first fluid port of the gearbox. The communication manner includes that the third port of the thermostatic valve and the first fluid port of the heat exchanger are respectively in communication with the first fluid port of the gearbox, and the third port of the thermostatic valve is in communication with the first fluid port of the heat exchanger, and the two ports are together in communication with the first fluid port of the gearbox.

The above description is merely a specific embodiment of the present application and does not limit the present application in any form. Although the present application is disclosed with the above preferred embodiments, the above preferred embodiments are not intended to limit the present application. Many variations and modifications may be made to the technical solution of the present application, or equivalent embodiments may be modified from the technical solution of the present application by those skilled in the art based on the methods and the technical contents disclosed above without departing from the scope of the present application. Therefore, all contents that do not depart from the technical solution of the present application, and any simple alteration, equivalent variation and modification made to the embodiments based on the technical substance of the present application should all fall in the protection scope of the present application.

The invention claimed is:

1. A thermostatic valve, comprising:
a valve body in which a chamber is provided,
an end cap assembly, and
a thermal actuator and a first spring mounted in the chamber, wherein:
the valve body is provided with at least three ports in communication with outside, the three ports comprises a first port, a second port and a third port;
the thermal actuator comprises a valve rod and a body portion, wherein
the chamber comprises a first chamber and a second chamber, the second chamber is smaller than the first chamber, the second chamber is away from the end cap assembly relative to the first chamber;
the first port is in communication with the first chamber, the third port is in communication with the second chamber;
the first spring is partially or wholly located in the second chamber;
the thermal actuator is mostly or wholly located in the first chamber, the first chamber is larger than the thermal actuator;
one end of the thermal actuator abuts against or indirectly abuts against or supports an end of the first spring close to the thermal actuator, and another end of the thermal actuator is limited to the end cap assembly; and
the thermostatic valve is further provided with a guide portion in the chamber, which is configured to guide the thermal actuator, the thermal actuator comprises a guide fitting portion fitting with the guide portion, and the guide portion is in sliding fit with the guide fitting portion; and
the end cap assembly comprises the guide portion, an inner diameter of the guide portion is greater than an outer diameter of the guide fitting portion of the thermal actuator by 0.05 mm to 0.5 mm, a length of the guide portion of the end cap assembly or a length of the guide fitting portion of the thermal actuator is greater than a stroke of the thermal actuator movable in the chamber, and the guide fitting portion of the thermal actuator is always in sliding fit with the guide portion while moving in the chamber.

2. The thermostatic valve according to claim 1, wherein the thermostatic valve comprises a first valve seat and a second valve seat fixedly arranged, the first valve seat comprises a first valve port, the first valve seat is located at a position of the second chamber relatively close to the first chamber, or the first valve seat is located at a position of the first chamber relatively close to the second chamber;
in an axial direction of the valve body, the first valve seat is located at a position between the first port and the third port of the valve body, the second valve seat is located at a position between the first port and the second port of the valve body;
the thermal actuator further comprises a first valve core arranged relative to the first valve seat and a second valve core arranged relative to the second valve seat, wherein the first valve core, the second valve core and the body portion of the thermal actuator are formed as an integral structure or are fixedly arranged;
the end cap assembly comprises a valve seat portion and a first connection portion, the valve seat portion is connected through the first connection portion, and the second valve seat is located at the valve seat portion.

3. The thermostatic valve according to claim 1, wherein the end cap assembly comprises a valve seat portion, the guide portion, a second connection portion and a first connection portion, each of the guide portion and the valve seat portion has an annular structure, an inner hole of the valve seat portion is smaller than an inner hole of the guide portion, an outer diameter of the valve seat portion is greater than an outer diameter of the guide portion;
the first connection portion connects the guide portion and the valve seat portion, the valve seat portion is located between the first connection portion and the second connection portion, the guide portion is located close to the first valve port relative to the valve seat portion; and
the body portion of the thermal actuator comprises an outer wall portion which is the guide fitting portion, and an inner diameter of the guide portion is greater than an outer diameter of the outer wall portion of the thermal actuator.

4. The thermostatic valve according to claim 2, wherein the end cap assembly comprises an end cap, a spring seat and a second spring, the end cap is provided with an accommodating chamber, the second spring and the spring seat are located in the accommodating chamber, the spring seat is limited to the accommodating chamber by a retainer ring or other limiting device fixedly arranged with the end cap, one end of the second spring abuts against the accommodating chamber, and another end of the second spring abuts against the spring seat;
the spring seat is sleeved on an end portion of a valve rod of the thermal actuator, and the valve rod partially extends into an inner chamber of the spring seat; and
the end cap comprises the valve seat portion, the guide portion and the first connection portion, the first connection portion connects the guide portion and the valve seat portion, the first connection portion is located between the guide portion and the valve seat portion.

5. The thermostatic valve according to claim 1, wherein the end cap assembly comprises an end cap, a spring seat, a second spring and a guide member, the end cap is provided with an accommodating chamber, the second spring and the spring seat are located in the accommodating chamber, the guide member is fixedly arranged with the end cap, the spring seat is limited to the accommodating chamber by the guide member, one end of the second spring abuts against the accommodating chamber and another end of the second spring abuts against the spring seat;

the spring seat is sleeved on an end portion of a valve rod of the thermal actuator, and the valve rod partially extends into an inner chamber of the spring seat; and the end cap comprises a valve seat portion, a first connection portion and a body portion for fitting with an open end of the chamber, the valve seat portion and the body portion are connected by the first connection portion, and the guide member is provided with a guide hole as the guide portion.

6. The thermostatic valve according to claim 1, wherein the end cap assembly comprises a second spring, a cap body, a seat body and a spring seat, the cap body and the seat body are relatively fixed and fitted by threads, the cap body is fitted with the seat body to form an accommodating chamber for arranging the second spring and the spring seat, the seat body is provided with a step portion for abutting against the spring seat, the second spring and the spring seat are located in the accommodating chamber, one end of the second spring abuts against the cap body, and another end of the second spring abuts against the spring seat;

the seat body comprises a valve seat portion, the guide portion and a first connection portion, the guide portion and the valve seat portion are connected by the first connection portion, the first connection portion is located between the guide portion and the valve seat portion; and the seat body is made of a plastic material by injection molding, and the cap body is made of a metal material.

7. The thermostatic valve according to claim 1, wherein the end cap assembly comprises a second spring, a cap body, a seat body and a spring seat, the cap body comprises an accommodating chamber for arranging the second spring and the spring seat, the accommodating chamber is provided with a groove for arranging a retainer ring, the retainer ring is partially located in the groove to achieve an axial position limitation, the spring seat abuts against the retainer ring, the second spring and the spring seat are located in the accommodating chamber, one end of the second spring abuts against the cap body, and another end of the second spring abuts against the spring seat;

the seat body comprises a valve seat portion, the guide portion and a first connection portion, the guide portion and the valve seat portion are connected by the first connection portion, the first connection portion is located between the guide portion and the valve seat portion;

the seat body is fixedly arranged with the cap body, or the seat body is tightly fitted with the cap body, or one or both of the seat body and the cap body are provided with a limiting structure for stopping the seat body from moving toward the cap body, and the valve body is provided with a step portion for position limiting at a position of the chamber fitting with the seat body to stop the seat body from moving toward the first valve port in the chamber.

8. The thermostatic valve according to claim 1, wherein the end cap assembly comprises a second spring, a cap body, a seat body and a spring seat, the cap body comprises an accommodating chamber for arranging the second spring and the spring seat, the accommodating chamber is provided with a groove for arranging a retainer ring, the retainer ring is partially located in the groove to achieve an axial position limitation, the spring seat abuts against the retainer ring, the second spring and the spring seat are located in the accommodating chamber, one end of the second spring abuts against the cap body, and another end of the second spring abuts against the spring seat;

the seat body comprises a valve seat portion, the guide portion and a first connection portion, the first connection portion connects the guide portion and the valve seat portion, the first connection portion is located between the guide portion and the valve seat portion;

the seat body is fixedly arranged with the cap body, or the seat body is tightly fitted with the cap body, or one or both of the seat body and the cap body are provided with a limiting structure for stopping the seat body from moving toward the cap body, and the valve body is provided with a step portion for position limiting at a position of the chamber fitting with the seat body to stop the seat from moving toward the first valve port in the chamber; and the guide portion is arranged close to the cap body relative to the valve seat portion, and the valve rod of the thermal actuator serves as a guide fitting portion fitting with the guide portion.

9. The thermostatic valve according to claim 8, wherein the valve body further comprises a fourth port in communication with the outside, the fourth port and the third port are respectively located at two opposite sides of the valve body, both the fourth port and the third port are in communication with the third chamber, the first port and the second port are respectively located on two opposite sides of the valve body, and in the four ports, the first port is located at the same side of the valve body as one of the third port and the fourth port.

10. A temperature control system, comprising a thermostatic valve, a heat exchanger and a gearbox, wherein the thermostatic valve is the thermostatic valve according to claim 1;

the heat exchanger comprises a first fluid port and a second fluid port, and the gearbox comprises a first fluid port and a second fluid port; wherein the first port of the thermostatic valve is in communication with the second fluid port of the gearbox, and the second port of the thermostatic valve is in communication with the second fluid port of the heat exchanger, the first fluid port of the heat exchanger serves as a fluid outlet of the heat exchanger, the second fluid port of the heat exchanger serves as a fluid inlet of the heat exchanger, and the second fluid port of the gearbox serves as a fluid outlet of the gearbox, the first fluid port of the gearbox serves as a fluid inlet of the gearbox; and a third port of the thermostatic valve is in communication with the first fluid port of the gearbox, and the first fluid port of the heat exchanger is in communication with the first fluid port of the gearbox.

11. A temperature control system, comprising a thermostatic valve, a heat exchanger and a gearbox, wherein the thermostatic valve is the thermostatic valve according to claim 9;

the heat exchanger comprises a first fluid port and a second fluid port, the gearbox comprises a first fluid port and a second fluid port; and the first port of the thermostatic valve is in communication with the second fluid port of the gearbox, and the fourth port of the thermostatic valve is in communication with the first fluid port of the gearbox, the second port of the thermostatic valve is in communication with the second fluid port of the heat exchanger, and the third port of the thermostatic valve is in communication with the first fluid port of the heat exchanger.

12. The temperature control system according to claim 11, wherein the first fluid port of the heat exchanger serves as a fluid inlet of the heat exchanger, and the second fluid port of the heat exchanger serves as a fluid outlet of the heat exchanger, the first fluid port of the gearbox serves as a fluid outlet of the gearbox, and the second fluid port of the gearbox serves as a fluid inlet of the gearbox; and an operation process of the temperature control system further comprises an abnormal pressure relief condition, in which a pressure of the second chamber is greater than a pressure of the first chamber of the thermostatic valve, a force generated by a difference between the pressure of the second chamber and the pressure of the first chamber makes the thermal actuator to be away from the first valve port to open the first valve port.

13. The thermostatic valve according to claim 2, wherein the end cap assembly comprises the valve seat portion, the guide portion, a second connection portion and the first connection portion, each of the guide portion and the valve seat portion has an annular structure, an inner hole of the valve seat portion is smaller than an inner hole of the guide portion, an outer diameter of the valve seat portion is greater than an outer diameter of the guide portion;

the first connection portion connects the guide portion and the valve seat portion, the valve seat portion is located between the first connection portion and the second connection portion, the guide portion is located close to the first valve port relative to the valve seat portion; and the body portion of the thermal actuator comprises an outer wall portion which is the guide fitting portion, and an inner diameter of the guide portion is greater than an outer diameter of the outer wall portion of the thermal actuator.

14. The thermostatic valve according to claim 2, wherein the end cap assembly comprises an end cap, a spring seat, a second spring and a guide member, the end cap is provided with an accommodating chamber, the second spring and the spring seat are located in the accommodating chamber, the guide member is fixedly arranged with the end cap, the spring seat is limited to the accommodating chamber by the guide member, one end of the second spring abuts against the accommodating chamber and another end of the second spring abuts against the spring seat;

the spring seat is sleeved on an end portion of a valve rod of the thermal actuator, and the valve rod partially extends into an inner chamber of the spring seat; and the end cap comprises the valve seat portion, the first connection portion and a body portion for fitting with an open end of the chamber, the valve seat portion and the body portion are connected by the first connection portion, and the guide member is provided with a guide hole as the guide portion.

15. The thermostatic valve according to claim 2, wherein the end cap assembly comprises a second spring, a cap body, a seat body and a spring seat, the cap body and the seat body are relatively fixed and fitted by threads, the cap body is fitted with the seat body to form an accommodating chamber for arranging the second spring and the spring seat, the seat body is provided with a step portion for abutting against the spring seat, the second spring and the spring seat are located in the accommodating chamber, one end of the second spring abuts against the cap body, and another end of the second spring abuts against the spring seat;

the seat body comprises the valve seat portion, the guide portion and the first connection portion, the guide portion and the valve seat portion are connected by the first connection portion, the first connection portion is located between the guide portion and the valve seat portion; and the seat body is made of a plastic material by injection molding, and the cap body is made of a metal material.

* * * * *